(12) United States Patent
White et al.

(10) Patent No.: US 8,721,339 B2
(45) Date of Patent: May 13, 2014

(54) SYSTEM AND METHOD FOR DETECTING A POINT OF ORIGINALITY IN A WRITING

(75) Inventors: Brandon M. White, Berkeley, CA (US); Johann A. Larusson, Waltham, MA (US)

(73) Assignees: Brandon M. White, Berkeley, CA (US); Johann Ari Larusson, Waltham, MA (US)

(*) Notice: Subject to any disclaimer, the term of this patent is extended or adjusted under 35 U.S.C. 154(b) by 168 days.

(21) Appl. No.: 13/245,235

(22) Filed: Sep. 26, 2011

(65) Prior Publication Data

US 2013/0078606 A1 Mar. 28, 2013

(51) Int. Cl.
*G09B 19/00* (2006.01)
(52) U.S. Cl.
USPC .......................................................... 434/156
(58) Field of Classification Search
USPC .......................................................... 434/367
See application file for complete search history.

(56) References Cited

U.S. PATENT DOCUMENTS 8,301,640 B2 * 10/2012 Al Badrashiny et al. ..... 707/748

OTHER PUBLICATIONS

Graber, et al.; "A Topic Model for Word Sense Disambiguation;" Proceedings of the 2007 Joint Conference on Empirical Methods in Natural Language Processing and Computational National Language Learning; Jun. 2007; pp. 1024-1033.
Crooks; "The Impact of Classroom Evaluation Practices on Students;" Review of Educational Research; vol. 58; No. 4; (Winter, 1988); pp. 438-481.
Eilam; Phase of Learning: ninth graders' skill acquisition; Research in Science & Technology Education; vol. 20; No. 1.
Gee, et al.; "Discourse Analysis, Learning, and Social Practice: A Methodological Study;" Review of Research in Education; vol. 23; 1998; pp. 119-169.
Greer, et al.; "Real-Time Analysis of Student Comprehension: An Assessment of Electronic Student Response Technology in an Introductory Earth Science Course;" Journal of Geoscience Education; vol. 52; No. 4; Sep. 2004; pp. 345-351.
Korthagen, et al.; "Levels in Learning;" Journal of Research in Science Teaching; vol. 32; No. 10; Dec. 1995; pp. 1011-1038.
McAlpine, et al.; "Reflection on Teaching: Types and Goals of Reflection;" Educational Research and Evaluation; vol. 10; Nos. 4-6; Dec. 2004; pp. 337-363.
McDonough, et al.; "Responses to Recasts: Repetitions, Primed Production, and Linguistic Development;" Language Learning; vol. 56; No. 4; Dec. 2006; pp. 693-720.

(Continued)

*Primary Examiner* — Robert J Utama
*Assistant Examiner* — Robert P Bullington
(74) *Attorney, Agent, or Firm* — Daly, Crowley, Mofford & Durkee, LLP

(57) ABSTRACT

This paper proposes a new method for the objective evaluation of student work through the identification of original content in writing assignments. Using WordNet as a lexical reference, this process allows instructors to track how key phrases are employed and evolve over the course of a student's writing, and to automatically visualize the point at which the student's language first demonstrates original thought, phrased in their own, original words. After sketching the method for isolating "points of originality," the paper provides a method for visualizing the resulting information. By visualizing otherwise subjective information in a way that is objectively intelligible, the goal is to provide educators with the ability to monitor student investment in concepts from the course syllabus, and to extend or modify the boundaries of the syllabus in anticipation of pre-existing knowledge or trends in interest.

14 Claims, 6 Drawing Sheets

(56) References Cited

OTHER PUBLICATIONS

Moore; "The Relationship Between the Originality of Essays and Variables in the Problem-Discovery Process: A Study of Creative and Noncreative Middle School Students;" Research in the Teaching of English; vol. 19; No. 1; Feb. 1985; pp. 84-95.

Nikolova, et al.; "Collecting Semantic Similarity Ratings to Connect Concepts in Assistive Communication Tools;" Modeling, Learning and Processing of Text Technological Data Structures; 2009; pp. 1-11.

Shih; "Content-Based Approaches to Teaching Academic Writing;" TESOL Quarterly; vol. 20; No. 4; Dec. 1986; pp. 617-648.

Taylor; "Content and Written Form: A Two-Way Street" TESOL Quarterly; vol. 15; No. 1; Mar. 1981; pp. 5-13.

Yang, et al.; "Measuring Semantic Similarity in the Taxonomy of WordNet;" in Proceedings of the 28th Australasian Conference; vol. 38; 2005; pp. 315-322.

* cited by examiner

SYSTEM AND METHOD FOR DETECTING A POINT OF ORIGINALITY IN A WRITING

CROSS REFERENCE TO RELATED APPLICATIONS

Not Applicable.

STATEMENT REGARDING FEDERALLY SPONSORED RESEARCH

Not Applicable.

FIELD OF THE INVENTION

The concepts described herein relate to a system and method for evaluating writing and more particularly to a system and method for the objective evaluation of a writing through the identification of original content in the writing.

BACKGROUND OF THE INVENTION

As is known in the art, for most if not all learning activities, a substantial amount of an instructor's time and effort is devoted to evaluating and monitoring the quality of students' work, and thus, hopefully, the depth of their learning. The purpose of this monitoring, however, is not merely the determination of grades; part of the instructor's work is entirely self-reflective, enabling the instructor to concurrently, or ideally even preemptively, intervene to make adjustments to course pedagogy based on students' engagement or understanding. While assigning grades might be facile, some difficulties complicate this second objective: how might an instructor intuit when, precisely, students have understood the material sufficiently? Making this determination manually would prove an intensely laborious and time consuming process, far more complicated than simple reading and re-reading of any single student's work.

When students engage in a writing activity, the final evaluation of their work cannot only assess whether the student has provided the most closely correct answer. Process is just as relevant to student writing as content. Student writing considered by an instructor to be exceptional is generally seen as that which demonstrates a mastery of the course material in new, profound or statistically unusual ways. The ideal is not only for students to confirm that they've understood lectures, but to do so in ways that even the instructor might not have thought of.

This process of mastery need not take place all at once. As a student is continually exposed to the same material, or is given the independent opportunity to rethink, reframe, or revisit that material, their writing on the subject has the chance to evolve, from rote regurgitation to wholly original expression. At the level of language, this evolution is reflected through recasting.

Recasting is the learning process whereby a student refines his or her understanding of a concept found in course lectures or readings by putting that concept into his or her own words. In the acquisition of new languages especially, this process can be useful, because it allows students to acquire new vocabulary using the assortment of words already available to them. Even where the student's understanding of a language is not an explicit concern, recasting can mark a student's attempts to graduate to more sophisticated or professionalized terminology, or, inversely but to the same end, to place new concepts into terms that are nearer to what the student would naturally be more likely to say. This process of learning aligns with theories of schema formulation, the sense-making process known as "scaffolding", as well as the express principles of educational constructivism.

For an instructor, the simple identification of recast terminology within a student's written work can provide an effective barometer for pedagogical self-reflection. If a subset of terms or concepts are deemed vital to the syllabus, repetitions and recast iterations of those same terms will at least suggest that those terms are being acknowledged and reflected upon.

SUMMARY OF THE INVENTION

In accordance with the concepts, techniques and systems described herein, it has been recognized that if the instructor hopes not only to identify instances where key concepts are deployed, but to determine how comprehensively the concepts are being internalized, it is first necessary to possess a method of scoring how original any given recast might be. In order to do this, we propose a metric for isolating a specific point of originality within student writing.

Also, it should be appreciated that, at higher levels of education, there is an increasing trend requiring students to submit materials in electronic form.

Through the application of lexical analysis to a writing (e.g. a student writing), and in accordance with the concepts, systems and techniques described herein, a method and system to track how a student's written language migrates from mere paraphrase to mastery are described. The method and system operate by isolating the moment when the student's understanding of core concepts best demonstrates the pedagogical principle of recasting. This moment is referred to herein as "point of originality."

The system and process described herein provide a model having a correspondence to cognitive activity which may be similar to, and ideally the same as, that which instructors or others might ordinarily undergo, yet in an automatic manner that is far less labor intensive. In one embodiment, the resulting data is presented to an evaluator (e.g. an instructor) by way of custom visualizations, which allow the evaluator to engage in continuous self-monitoring with minimally expended effort.

In accordance with the concepts, systems and techniques described herein, a method for evaluating a writing through the identification of original content in the writing includes: (a) submitting the writing to a processing system; (b) inputting a query term; (c) constructing a lexical relationship matrix of relationships between lexical terms generated from the query term; (d) searching the writing for terms which appear in the lexical relationship matrix; and (e) computing an originality estimate value for each of the terms in the writing which match one or more terms in the lexical relationship matrix, wherein the originality estimate value is based upon the lexical relationships between the terms in the writing and the terms in the lexical relationship matrix.

With this particular arrangement, a method for evaluating a point of originality in a writing is provided. Typically, a plurality of query terms are provided and terms and relationships generated from the query terms are stored in one or more lexical relationship matrices. In one embodiment, a single lexical relationship matrix holds terms and relationships generated via a lexical database from a plurality of different query terms.

In one embodiment, computing the originality estimate value is accomplished by computing an originality estimate value a according to the equation: $\alpha = \delta \times 0.7 \times t$ in which $\delta$ corresponds to a value representing a distance (i.e. a metric) between the word in the writing found in the lexical relationship matrix and the query term; and t corresponds to a value representing a word type—i.e. a relationship (e.g. synonym, antonym, hypernym, hyponym, holonym, meronym) between the query terms and terms found in the lexical database.

In one embodiment, the method further includes repeating (b)-(e) for a plurality of different query terms to provide a corresponding plurality of originality estimate values and summing the plurality of originality estimate values to produce a point of originality score for the writing.

In one embodiment, submitting a writing to a processing system includes checking a format of an electronic document containing the writing to determine whether the electronic document is in a format accepted by the processing system. I n response to the electronic document not being in a format accepted by the processing system, then either notifying a user of a formal incompatibility or placing the document in a format accepted by the processing system.

In one embodiment after computing a point of originality score the process and system can present the point of originality score on a display in the form of a timeline graph.

In one embodiment the query term is a first one of a plurality of query terms and the matrix of relationships is a first one of a plurality of matrices of relationships. The process further includes: computing an originality estimate value $\alpha$ for each word in the student writing found in one or more of the plurality of matrices and computing a point of originality score for the writing using each of the computed originality estimate values.

In one embodiment, the writing is a student writing and the process is repeated for each of a plurality of writings by the same student.

In accordance with a further aspect of the concepts, systems and techniques described herein, a method for the objective evaluation of a student writing, includes identifying original content in the student writing and computing an originality score based upon one or more words in the student writing and lexical relationships between each of the one or more words in the student writing and one or more selected query terms.

In one embodiment, identifying original content in the student writing comprises isolating one or more points of originality in the student writing. In one embodiment, isolating one or more points of originality in the student writing is accomplished by receiving a first query term generating a first matrix of relationships between lexical terms based upon the first query term, searching the student writing for words which appear in the matrix and computing a first originality score based upon the lexical relationships between the words in the student writing which also appear in the first matrix.

In one embodiment, computing an originality score is done by computing an originality estimate $\alpha$ according to the equation: $\alpha = \delta \times 0.7 \times t$ and wherein $\delta$ corresponds to a value representing a distance between the word in the student writing found in the matrix and the query term; and t corresponds to a value representing a word type.

In one embodiment, the first query term is a first one of a plurality of query terms and the first matrix of relationships is a first one of a plurality of matrices of relationships and an originality estimate $\alpha$ is computed for each word in the student writing found in one or more of the plurality of matrices and a point of originality for the student writing is computed using each of the computed originality estimates.

In one embodiment, computing a point of originality for the student writing using each of the computed originality estimates is accomplished by summing each of the originality estimates and the point of originality for the student writing corresponds to the sum of the originality estimates. The point of originality can then be visualized. on a timeline graph.

In accordance with a still further aspect of the concepts, systems and techniques described herein, a system includes means for constructing a first matrix of relationships between lexical terms generated from a first query term and means for searching a writing for terms which appear in the first matrix and for computing an originality estimate value for each of the terms in the writing which match one or more terms in the first matrix.

With this particular arrangement, a system for evaluating a point of originality in a writing is provided. In one embodiment, the originality estimate value is based upon the lexical relationships between the terms in the writing and the terms in the first matrix.

BRIEF DESCRIPTION OF THE DRAWINGS

The foregoing features of the concepts, systems, circuits and techniques described herein may be more fully understood from the following description of the drawings in which.

DETAILED DESCRIPTION OF THE PREFERRED EMBODIMENTS

Figure 1:
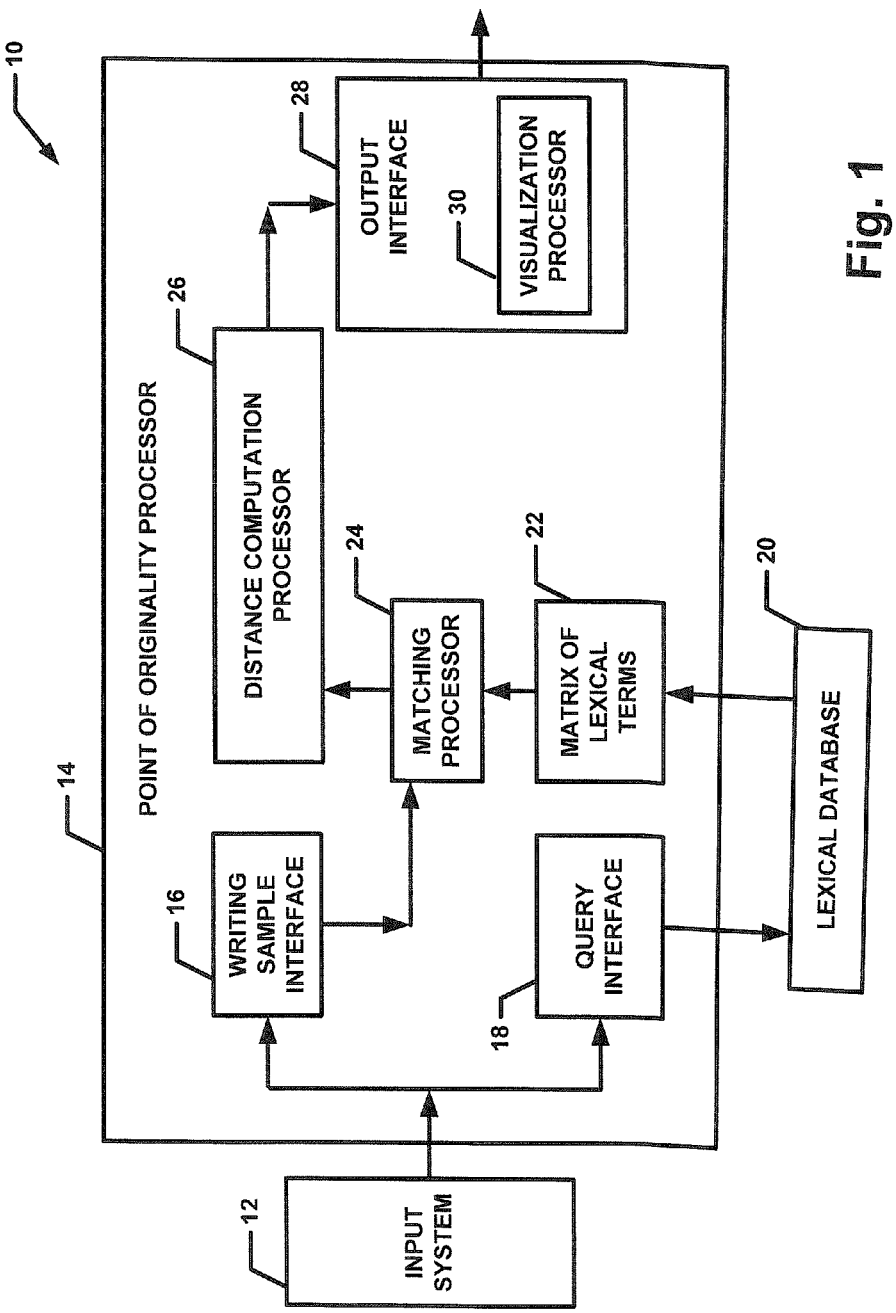
FIG. 1 is a block diagram of an exemplary system for detecting a point of originality in a writing.

Referring now to FIG. 1, a system 10 for objectively determining a point of originality in a writing includes an input system 12 through which a user (e.g. an instructor, an educator, a faculty member, researcher or a student) submits a writing to a point of originality processor 14 and more particularly to a writing sample interface 16. In one embodiment, system 10 processes writings submitted in a particular format. In such embodiments, when a writing is submitted in a format not compatible with the desired system format, a message (e.g. an error message) is provided to the user. Such a message may be provided by input system 12 or interface 16 or by some other portion of processor 14. In other embodiments, however, when a writing is submitted in a format not compatible with the desired system format, system 10 converts or otherwise places the document in a format accepted by the processing system. For example, in response to an electronic document submitted through input system 12 not being in a format accepted by processor 14, processor 14 (e.g. via writing sample interface 16) places the document into a format accepted by processor 14.

Input system 12 also allows a user to submit one or more query terms to point of originality processor 14 and more particularly to a query interface 18. I n some embodiments, a user manually selects the query terms while in other embodiments, selection of the query terms is automated. Query interface 18 receives each query term provided thereto and provides each of the query terms to a lexical database 20. Lexical database 20 provides lexical terms back to point or originality processor 14. As shown in the exemplary embodiment of FIG. 1, the terms as well as the term's relationship to the query term is stored in a matrix of lexical terms 22. Although a single matrix is shown in the exemplary embodiment of FIG. 1, multiple matrices (e.g. one matrix for each query term) may also be used. Other forms of storing the terms as well as the term's relationship to the query term are also possible for a functional embodiment and will be apparent to one of ordinary skill in the art after reading the description provided herein.

Lexical database 20 arranges nouns, verbs, adjectives, and adverbs by their conceptual-semantic and lexical relationships. Whereas a simple thesaurus would be able to identify any two words as synonyms or antonyms of one another, lexical database 20 is able to note the similarity between two words that don't have literally identical meanings. These relationships are ideally meant to mirror the same lexical associations made by human cognition. In one exemplary embodiment, lexical database 20 may be provided as a lexical database of English referred to as WordNet made available through Princeton University at http://wordnet.princeton.edu/wordnet/license/.

Figure 1A:
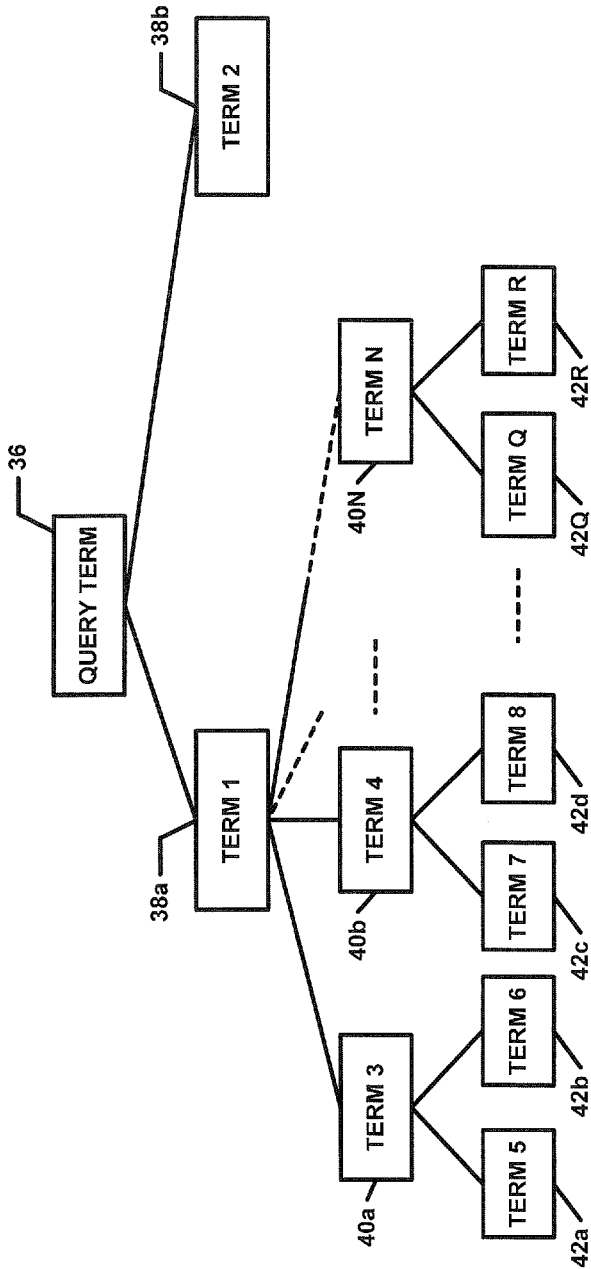
FIG. 1A is a graphical representation of a portion of information stored in a matrix of lexical terms.
Figure 2:
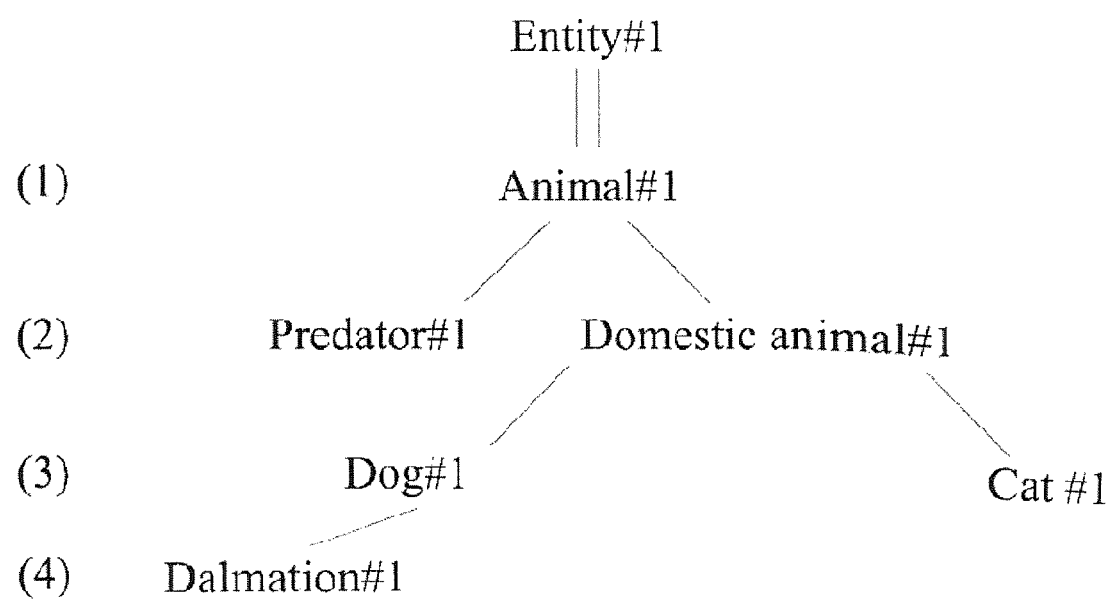
FIG. 2 is a model synset tree (by hyponym relation)

WordNet's arrangement is hierarchical, which is to say that certain terms are more closely related than others. Within WordNet, these relationships are displayed as so-called "synsets," clusters of terms that branch, like neurons or tree branches, from more specific to more and more diffuse associations (e.g. as illustrated in FIGS. 1A and 2). If two words are found within one another's synset tree, it stands to reason that these terms are, in some way, related, be it closely or distantly.

As will be described in detail further below, point of originality processor 14 computes distances between two terms, and assigns a value commensurate with their degree of semantic relatedness.

Thus, in response to receiving a query term from query interface 18, lexical database 20 provides one or more related words (be they closely or distantly related to the query term), to processor 14 which stores the terms (i.e. the set of synset matches found in any given writing) and their relationship to the query term in the matrix of lexical terms 22.

In one embodiment, and referring briefly to FIG. 1A, the matrix of lexical terms 22 may be graphically represented as one or more tree structures with each tree having the query term as a root node. That is, each query term input to the system (e.g. via input system 12 and/or otherwise provided to query interface 18) serves as a root node for a tree based upon that query term. In one exemplary embodiment, to generate a single "tree," a query term such as query term 36 is provided to lexical database 20 which may return one or more additional terms (e.g. terms 38a, 38b) in response to query term 36. Terms 38a, 38b are then, in turn, provided to lexical database 20 which again may provide one or more additional terms (e.g. terms 40a-40N).

It should be noted that in the example of FIG. 1A, while lexical database 20 returned terms 40a-40N in response to receiving term 38a, lexical database 20 did not return any additional terms in response to receiving term 38b. Thus, the "tree" structure need not be symmetric. Also, it should be appreciated that a user may decide how many terms to return to lexical database 20 before ending the process of generating new "branches" (i.e. terms) in the tree. In some embodiments, it may be desirable to use a fixed value (i.e. return to lexical database 20 a fixed number of times). In one particular embodiment, a fixed value of six (6) is used. As discussed above, regardless of the number of terms 42a-42R generated by lexical database 20, each of the terms as well as the terms' relationship to the query term is stored in the matrix of lexical terms 22 (FIG. 1).

Returning now to FIG. 1, a matching processor 24, receives one or more lexical terms from matrix of lexical terms 22 and searches the writing provided to writing interface 16 for terms which match either the query term(s) or the lexical term(s) generated from the query term(s). The results of the search (i.e. the matched words) are provided to a distance computation processor 26.

When matches are found, a distance computation processor 26 performs a distance calculation between the original query term and the match within the student's work. In one embodiment, this is performed as follows:

Let β be a supplied query term (e.g. supplied by a user or automatically supplied). Then, let Q be a set containing all synset word matches from the lexical database for β.

Let W be a set of all words from a given student assignment and let S be a set of stop words, a list of common words in English usage (like "the" or "and") to be omitted to speed up processing time. Then, M, the set of synset terms found in any given writing sample can be defined as:

$$M = (Q-S) \cap W$$

As noted above, terms and relationships from lexical database 20 are stored in the matrix of lexical terms 22 and the terms (sometimes referred to as synset matches) may be graphically represented as a tree structure having the root node defined as β. Then, δ, the distance (depth) for any given synset (γ) in M from the root node (query term) β may be defined as:

$$\delta = 0 \text{ if } \gamma = \beta$$

$$\delta = 1 \text{ if } \gamma \text{ is first child of } \beta$$

$$\delta = 2 \text{ if } \gamma \text{ is second child of } \beta$$

$$\delta = N \text{ if } \gamma \text{ is Nth child of } \beta$$

Lexical database 20 also supplies the type of each synset term. Thus, t, the "word type" of any given synset term in M, may be defined as:

$$T = 1.00 \text{ if } \gamma = \beta$$

$$T = 0.90 \text{ if } \gamma = \text{synonym/antonym}$$

$$T = 0.85 \text{ if } \gamma = \text{hypernym/holonym}$$

$$T = 0.85 \text{ if } \gamma = \text{holonym/meronym}$$

Then, α, the weight for any given synset term in M in the general "point of originality" estimate is calculated as follows:

$$\alpha = (\delta \times 0.7) \times t$$

In one embodiment, the depth for any given synset term, defined by δ is multiplied by a constant value of 0.7, which reflects the diminished associations between terms the farther separated two terms are along the synset tree. This value is selected because it corresponds with the calculation of distance between terms that yields the nearest match with human intuition. It should, of course, be appreciated that in some instances a value other than 0.7 may be used as the constant value. Similarly, it should be appreciated that the values of distances δ may be set as any zero or non-zero value and likewise the values for each "word type," t, of any given synset term may be assigned any zero or non-zero value.

Then, P, the point of originality in a given student's writing for the query term β, can be defined as:

$$P(\beta) = \sum_{n=0}^{|M|} \alpha_n$$

This same calculation may then performed for all of the writing samples by a given student or other user of the system.

Distance computation processor 26 provides the results to an output interface 28 which displays or otherwise makes the results available to a user. In one embodiment, output interface includes a visualization processor 30. In one embodiment, once a point of originality is calculated, visualization processor 30 generate s a plot of all instances of originality. An exemplary plot corresponding to a horizontal timeline is shown and described below in conjunction with FIG. 4.

Referring now to FIG. 2, a hierarchical arrangement inherent to a lexical database 20 (FIG. 1) such as WordNet is shown providing one method of determining the relationship between two terms. If the synset tree of one term encompasses another term, it is simple enough to note how many synset jumps it takes to move from one to another, As shown in the exemplary embodiment of FIG. 2, a "Dalmatian" is a type of "dog," which itself belongs to the subcategory of "domestic animals;" thus, there are two tiers of associations between the concepts of "Dalmatian" and "domestic animals." Unfortunately, however, just how closely any two terms might be related is not a purely linear relationship. Lexical database 20 (FIG. 1) organizes related terms by their precise lexical entailment, such that nouns might be categorized as synonyms, hypernyms, hyponyms, holonyms and merony, as seen in Table 1.

TABLE 1

Possible Lexical Entailments in Lexical Database

| TYPE | MEANING | EXAMPLE |
| --- | --- | --- |
| Synonym | X is a synonym of Y if X means Y | {smile, grin} |
| Hypernym | X is a hypernym of Y if every X is a kind of Y | {dog, mammal} |
| Hyponym | X is a hyponym of Y if every Y is a kind of X | {mammal, dog} |
| Holonym | X is a holonym of Y if Y is part of X | {hand, finger} |
| Meronym | X is a meronym of Y if X is part of Y | {finger, hand} |

These possible entailments provide a rudimentary roadmap f or all the ways in which two words might be related. Since lexical database 20 attempts to map the cognitive associations automatically formed between words, a student's evocation of the holonym or hypernym of a given noun instead of the noun itself is more likely to form an associative recast of the original term. Yet while this simple index displays just how any two terms might be related, all the possible relationships noted are not necessarily equal. Some relationships, like that between synonyms smile and grin, are bound to be more strongly associated than that between mammal and dog.

Thus, as described above, it is possible to install a series of weights that can best calculate the semantic distance between any two terms. This method in particular is useful because of all possible methods, it bears the highest correspondence between its own distance calculations and the intuitions of actual human respondents.

Figure 3:
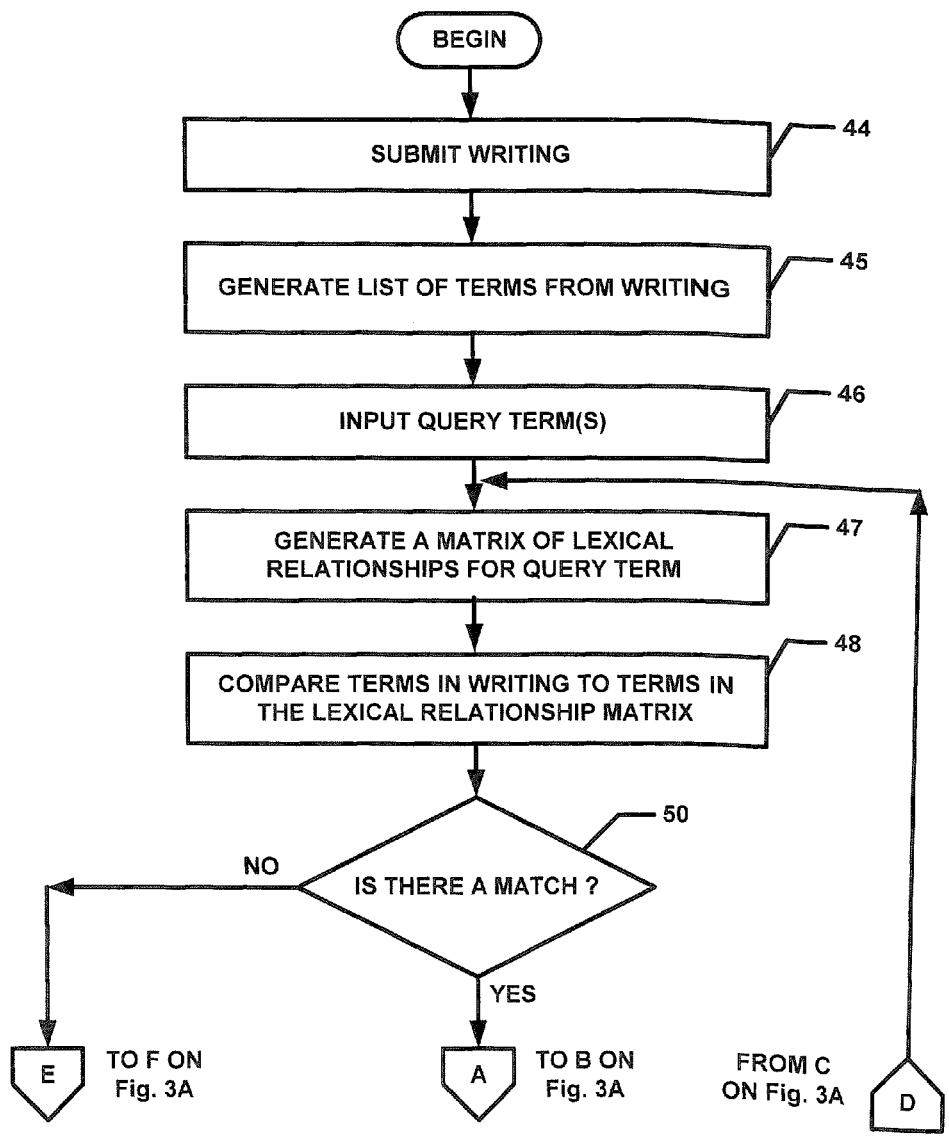
FIGS. 3 and 3A are series of flow diagrams which illustrate an exemplary process for detecting a point of originality in a writing.
Figure 3A:
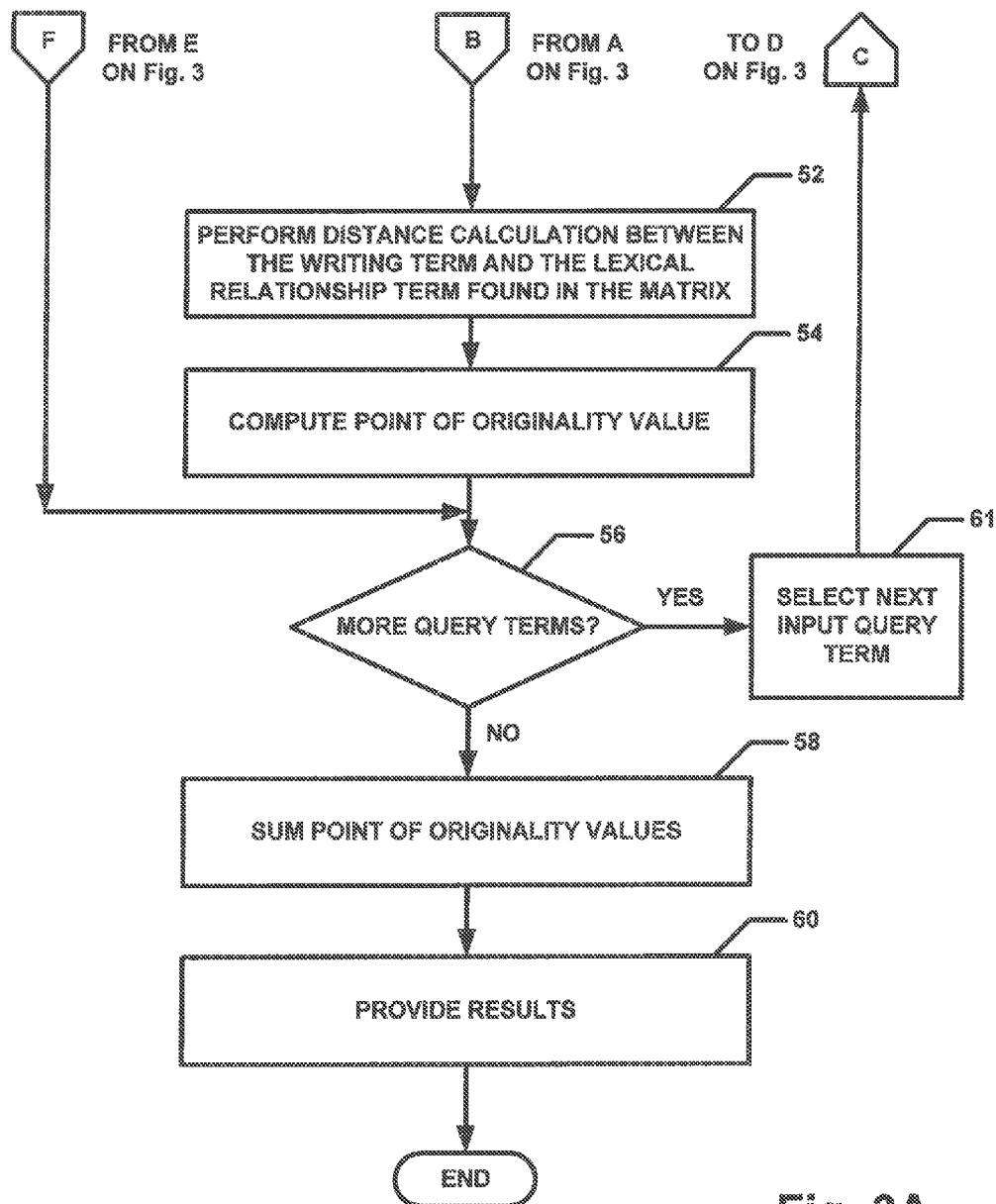

FIGS. 3 and 3A are a series of flow diagrams showing the processing performed by a processing apparatus which may, for example, be provided as part of a system for objectively determining a point of originality in a writing such as that shown and described in FIG. 1. The rectangular elements (e.g. block 46 in FIG. 3) in the flow diagrams of FIGS. 3 and 3A are herein denoted "processing blocks" and represent steps or instructions or groups of instructions. Some of the processing blocks can represent an empirical procedure or a database while others can represent computer software instructions or groups of instructions. The diamond shaped elements in the flow diagrams (e.g. block 50 in FIG. 3) are herein denoted "decision blocks" and represent steps or instructions or groups of instructions which affect the processing of the processing blocks. Thus, some of the steps described in the flow diagram may be implemented via computer software while others may be implemented in a different manner e.g. via an empirical procedure.

Alternatively, some of the processing blocks can represent steps performed by functionally equivalent circuits such as a digital signal processor circuit or an application specific integrated circuit (ASIC) or a neural network. The flow diagram does not depict the syntax of any particular programming language. Rather, the flow diagram illustrates the functional information one of ordinary skill in the art requires to perform the steps or to fabricate circuits or to generate computer software to perform the processing required of the particular apparatus. It should be noted that where computer software can be used, many routine program elements, such as initialization of loop s and variables and the use of temporary variables are not shown. It will be appreciated by those of ordinary skill in the art that unless otherwise indicated herein, the particular sequence of steps described is illustrative only and can be varied without departing from the spirit of the concepts, techniques and systems described herein.

Turning now to FIGS. 3 and 3A, a process to evaluate a writing through the identification of original content in the writing begins in processing block 44 in which a writing is submitted to a processing system. In some embodiments, the writing may be student writing (e.g. term paper, blog or other writing) which an instructor (e.g. high school teacher, college professors or other educator or another type of instructor) will evaluate using, at least in part, the system and techniques described herein. In one embodiment, submitting a writing to a processing system includes checking a format of an electronic document containing the writing to determine whether the electronic document is in a format accepted by the processing system. In response to the electronic document not being in a format accepted by the processing system, the system either provides notification of the incompatibility (in which case processing ends) or places the document in a format accepted by the processing system.

Processing then proceeds to processing block 45 in which a list of one or more words or phrases, i.e. groups of words, (collectively, terms) in the writing are identified. As apparent from the description herein, the terms identified are used to perform an objective evaluation of the writing.

Processing then proceeds to processing block 46 in which one or more query terms are selected. In one embodiment, selection of one or more query terms is automated. In other embodiments, a user (e.g. an instructor or even a student) manually selects one or more query terms. In still other embodiments, a combination of automated and manual selection may be used.

Once the one or more query terms are selected, the process continues by constructing a first matrix of relationships between lexical terms generated for each of the one or more query terms as shown in processing block 47. This may be accomplished, for example, with the use of a lexical database (e.g. by providing each query term to a lexical database such as WordNet and receiving back from the lexical database lexical terms which are related to the query term and forming the matrix of relationships based upon the lexical terms provided by the lexical database). The first matrix of relationships includes both the terms and the relationship of the terms (e.g. homonym, synonym, etc . . . ) to the query term.

Processing then proceeds to processing block 48 in which terms in the writing (i.e. the list of terms generated in processing block 45) are compared with terms in the lexical relationship matrix generated in processing block 47. That is, a searching of the writing is performed to identify terms which appear in the lexical relationship matrix.

Processing then proceeds to decision block 50 in which it is determined whether a match is found between a term in the writing and a term in the lexical relationship matrix. If no match is found, then processing proceeds to decision block 56 and if no other query terms remain, then processing proceeds to processing blocks 58, 60 in which the point of originality values are summed (e.g. as described above in conjunction with FIG. 1) and an output is provided. In one embodiment, as will be shown below in conjunction with FIG. 4, the output is provided by presenting the point of originality value on a timeline graph.

If in decision block 56 a decision is made that more query terms remain to be processed, then processing flows to processing block 61 where anther query term is selected and then processing loops back to processing block 47 and the processing describe in blocks 47-56 are repeated until all query terms are processed.

It should be noted that in processing block 58 the process computes an originality estimate value for each of the terms in the writing which match one or more terms in the matrix. Typically there will be a plurality of originality estimate values which are summed to produce a "point of originality" value for the writing. If in decision, block 50 it is determined that a match is found between a term in the writing and a term in the lexical relationship matrix, then processing proceeds to processing block 52 where a distance calculation between the writing term and the lexical relationship term found in the matrix is performed and then processing proceeds to processing block 54 in which a point of originality value is computed. Processing then proceeds to blocks 56-62 as described above.

As noted above in conjunction with FIG. 1, the originality estimate values are based upon the lexical relationships between the terms in the writing and the terms in the lexical relationship matrix. As, also discussed above in conjunction with FIG. 1, in one embodiment, computing the originality estimate value corresponds to computing an originality estimate value $\alpha$ according to the equation:

$$\alpha = \delta \times 0.7 \times t$$

in which $\delta$ corresponds to a value representing a distance between the word in the writing found in the matrix and the query term; and $t$ corresponds to a value representing a word type as defined above.

It should be appreciated that the process of FIGS. 3 and 3A can be repeated for each of a plurality of writings by the same student. Then, all originality evaluations of the student's writings may be displayed on a timeline graph.

It is recognized that it is important to ensure the accuracy of results. Although possible query terms for analysis are literally endless, single-word queries have a higher likelihood of accidentally triggering false positives that might not indicate originality, but simple misuse; if an instructor sought to determine student activity relating to feline vision, a writing sample with frequent reference to Dalmatians might be original or simply irrelevant. In order to mitigate the likelihood of erroneous returns, it is possible, and indeed advisable, to use compound phrases, or to otherwise combine query terms that still correspond with the key concepts of a given course.

For example, in the fifth week of a course on the Internet and Society, taught in the fall of 2008 in the Department of Computer Science at Brandeis University, students were given a specific essay prompt that asked them to address the concept of "innovation" as it related to constraints of information "layers," "resources," and "control." While students had uniformly discussed the concept of "innovation" in their earlier work, it is possible to restrict the proportional weight of the P values across writing samples by searching for all of the relevant concepts simultaneously. Thus writings demonstrating high P values would not simply be those with frequent synset matches for "innovation," but for the additional concepts being tested.

In the earlier hypothetical then, rather than simply searching for "cat" or "feline," the instructor might literally search for "feline vision." Having done so, a post extraneously mentioning "Dalmations" would not be weighted as highly as one more appropriately discussing "color blindness in dogs."

Figure 4:
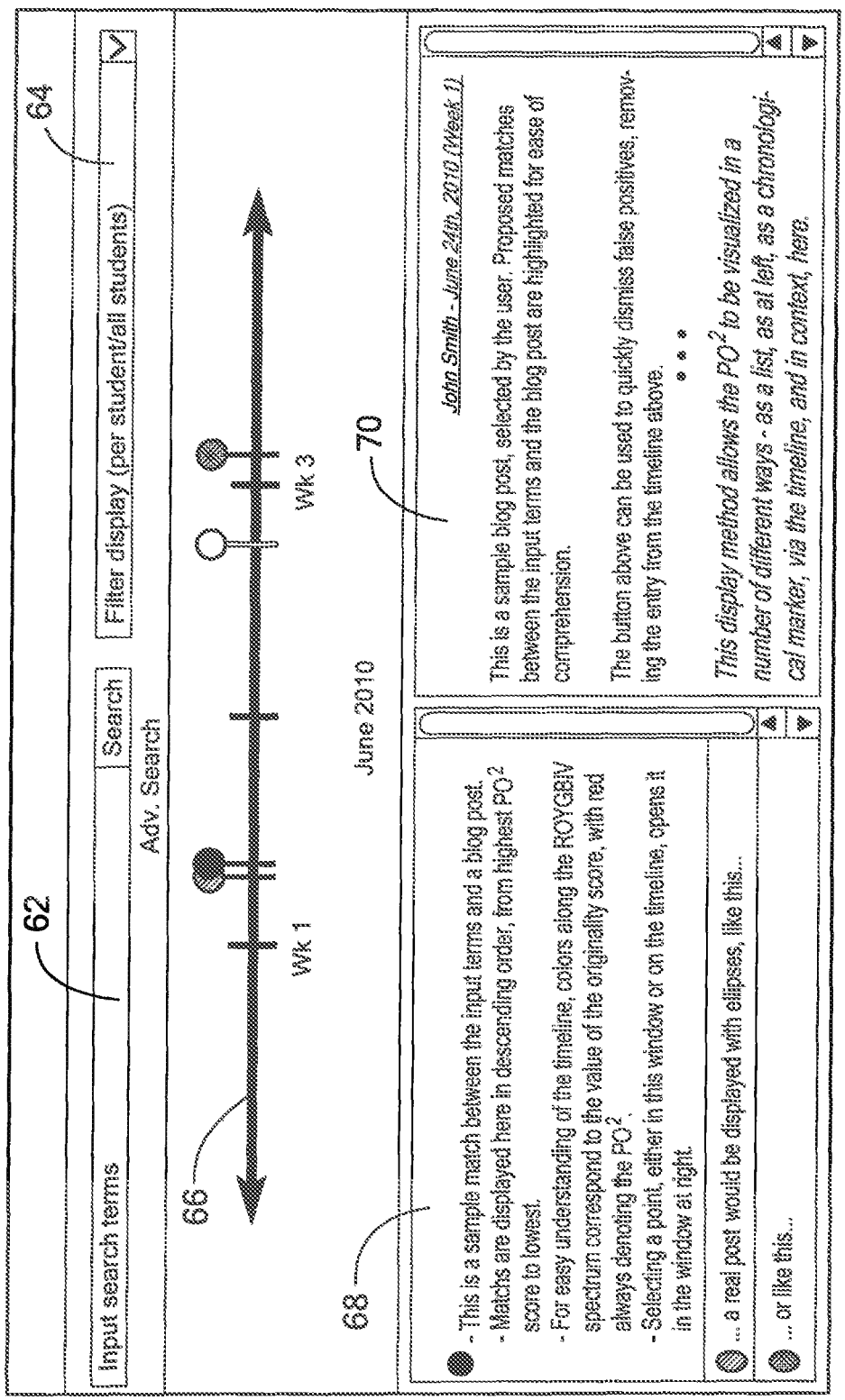
FIG. 4 is an example of a visualization of the results of detecting a point of originality in a writing.

Referring now to FIG. 4, a technique for visualization of the point of originality (e.g. as may be shown on a display for example) includes a timeline visualization comprising a horizontal timeline that represents a time interval for a writing activity. For example, the writing activity of a student for the duration of a particular semester. Such a horizontal timeline can enhance, or in some cases even optimize, instructor comprehension.

Reference numeral 62 (also denoted with numeral 1) corresponds to a field in which a query term ($\beta$) is input(by an instructor, for example).

Reference numeral 64 (also denoted with numeral 2) corresponds to a drop-down menu which allows the instructor to select which student's writing samples are currently being displayed.

Reference numeral 66 (also denotes with numeral 3) corresponds to a timeline on which is associated date(s) and/or time(s) of each of a student's writing samples. By default, all markers share the same default color, a monochrome black. Writing samples are then color-coded, from colder to warmer colors along the ROYGBIV spectrum, the higher the value of the point of originality (P) score for any given writing sample, These color assignments present an intuitive way for the instructor to quickly recognize that the sample has been assigned a higher originality value.

Reference numeral 68 denotes a window which displays the student's writing samples in excerpted form, which according to one embodiment may be a list, with the matches between the query terms and the synset terms found within the writing sample (M) highlighted in the same color as that sample's marker color. The colored marker itself is displayed as the sample's bullet point. By default, this window is pre-sorted, from highest P value to lowest.

Reference numeral 70 denotes another window. If a writing sample marker is selected, either in the timeline window 66 or in the window which displays the student's writing samples in excerpted form 68, the text of that writing sample is displayed here, again, with the matched synset terms (M) highlighted. This assortment of visualization options allows the point of originality calculation to be displayed in a number of intuitive ways: as a window which displays the student's writing samples in excerpted form 68, which according to one embodiment may be a list, within a timeline 66, and in context 70.

Having described preferred embodiments of the concepts, systems, circuits and techniques described herein, it will now become apparent to those of ordinary skill in the art that other embodiments incorporating these concepts may be used. For example, it should now be appreciated that one can apply the topologies described herein to rectifier systems (e.g. for grid-connected power supplies) as well and for bidirectional power flow converter systems. Accordingly, it is submitted that that the concepts, systems, circuits and techniques described herein, should not be limited to the described embodiments but rather should be limited only by the spirit and scope of the appended claims.

The invention claimed is:

1. A method for evaluating a point of originality in a single piece of writing through the identification of original content in the writing, the method comprising:
   (a) submitting the single piece of writing to a processing system;
   (b) inputting a first query term, wherein the first query terms is one of a single word or a compound phrase;
   (c) generating lexical terms from the first query terms;
   (d) constructing a first matrix of conceptual-semantic and lexical relationships based upon the lexical terms generated from the first query term;
   (e) searching the writing for terms which appear in the first matrix; and
   (f) computing an originality estimate value for each of the terms in the writing which match one or more terms in the first matrix, wherein the originality estimate value is based upon the lexical relationships between the terms in the writing and the terms in the first matrix;
   (g) computing a point of originality score; and
   (h) presenting the point of originality score on a timeline graph, wherein the timeline graph depicts the evolution of point of originality scores for a particular person over a period of time.

2. The method of claim 1 wherein computing an originality estimate value corresponds to computing an originality estimate value a according to the equation: $\alpha=\delta \times 0.7 \times t$ and wherein $\delta$ corresponds to a value representing a distance between the word in the writing found in the matrix and the query term; and t corresponds to a value representing a word type.

3. The method of claim 1 further comprising:
   (i) repeating (b)-(f) for a plurality of different query terms to provide a corresponding plurality of originality estimate values; and
   (j) summing the plurality of originality estimate values to produce a point of originality score for the writing.

4. The method of claim 1 wherein submitting a writing to a processing system comprises:
   checking a format of an electronic document containing the writing to determine whether the electronic document is in a format accepted by the processing system; and
   is response to the electronic document not being in a format accepted by the processing system, placing the document in a format accepted by the processing system.

5. The method of claim 2 wherein: the first query term is a first one of a plurality of query terms; the first matrix of relationships is a first one of a plurality of matrices of relationships and the method further comprises:
   computing an originality estimate value α for each word in the student writing found in one or more of the plurality of matrices; and
   computing a point of originality score for the writing using each of the computed originality estimate values.

6. The method of claim 2 wherein the writing is a student writing.

7. The method of claim 6 further comprising repeating the method of claim 1 for each of a plurality of writings by the same student.

8. The method of claim, 7 further comprising presenting plotting all instances each point of originality score generated for each of the plurality of writings by the same student on a timeline graph, wherein the timeline graph depicts the evolution of point of originality scores for the particular student over a period of time.

9. A method for the objective evaluation of a student writing, the method comprising:
   (a) identifying original content in the student writing using a computer processor, wherein identifying original content in the student content comprises isolating one or more points of originality in the student writing; and
   (b) computing an originality score using a computer processor based upon one or more words in the student writing and lexical relationships between each of the one or more words in the student writing and one or more selected query terms,
   wherein isolating one or more points of originality in the student writing comprises:
   receiving a first query term, wherein the first query terms is a single word or a compound phrase;
   generating a first matrix of conceptual semantic and lexical relationships based upon lexical terms based upon the first query term: searching the student writing for words which appear in the matrix; and computing an originality score based upon the lexical relationships between the words in the student writing which also appear in the first matrix,
   wherein computing an originality score comprises computing an originality estimate α according to the equation: $\alpha=\delta \times 0.7 \times t$ and wherein $\delta$ corresponds to a value representing a distance between the word in the student writing found in the matrix and the query term; and t corresponds to a value representing a word type,
   wherein the point of originality corresponds to a moment when a student's understanding of core concepts best demonstrates a pedagogical principle of recasting, wherein recasting is a learning process whereby a student refines his or her understanding of a concept found in course lectures or readings by putting that concept into his or her own words.

10. The method of claim 9 wherein; the first query term is a first one of a plurality of query terms; the first matrix of relationships is a first one of a plurality of matrices of relationships; and the method further comprises:
    computing an originality estimate α for each word in the student writing found in one or more of the plurality of matrices; and
    computing a point of originality for the student writing using each of the computed originality estimates.

11. The method of claim 10 wherein computing a point of originality for the student writing using each of the computed originality estimates comprises summing each of the originality estimates and wherein the point of originality for the student writing corresponds to the summed originality estimates.

12. The method of claim 11 further comprising presenting the point of originality score on a timeline graph, wherein the timeline graph depicts the evolution of point of originality scores for the student over a period of time.

13. The method of claim 1 wherein the first matrix of conceptual-semantic and lexical relationships is generated by a lexical database, wherein the lexical database is substantially capable of arranging the query terms by noting the similarity between two words that don't have literally identical meanings.

14. The method of claim 1 wherein the first query term is substantially related to the concept being monitored in the writing.

\* \* \* \* \*